US006661013B2

(12) United States Patent
Jagutzki et al.

(10) Patent No.: US 6,661,013 B2
(45) Date of Patent: Dec. 9, 2003

(54) DEVICE AND METHOD FOR TWO-DIMENSIONAL DETECTION OF PARTICLES OR ELECTROMAGNETIC RADIATION

(75) Inventors: Ottmar Jagutzki, Frankfurt (DE); Horst Schmidt-Böcking, Kelkheim (DE); Volker Mergel, Wiesbaden (DE); Alfred Cerezo, Marston (GB); Min Huang, New Marston (GB)

(73) Assignees: Roentdek Mandels GmbH, Kelhiem (DE); Oxford Nanascience Ltd., Oxfordshire (GB)

( * ) Notice: Subject to any disclaimer, the term of this patent is extended or adjusted under 35 U.S.C. 154(b) by 0 days.

(21) Appl. No.: 09/782,003

(22) Filed: Feb. 12, 2001

(65) Prior Publication Data

US 2002/0014839 A1 Feb. 7, 2002

(30) Foreign Application Priority Data

Feb. 11, 2000 (GB) .............................................. 0003261
Sep. 24, 2000 (DE) ........................................ 100 47 688

(51) Int. Cl.⁷ ............................................... H01J 47/20
(52) U.S. Cl. .................................... 250/385.1; 250/389
(58) Field of Search .................................. 250/214, 385, 250/374, 394, 389, 361 R; 313/531

(56) References Cited

U.S. PATENT DOCUMENTS

| 4,870,282 A | * | 9/1989 | Lacy .......................... 250/385 |
| 5,192,861 A | * | 3/1993 | Breskin et al. ....... 250/214 VT |
| 5,644,128 A | * | 7/1997 | Wollnik et al. ............. 250/251 |
| 6,072,523 A | * | 6/2000 | Zajfman et al. .............. 348/42 |

OTHER PUBLICATIONS

W. Koenig et al., "A multiparticle 3D imaging technique to study the structure of molecular ions," Nuclear Instruments and Methods in Physics Research B10/11, 259–265 (1985) (Elsevier Science Publishers B.V.).*

S. E. Sobottka et al., "Delay line readout of microchannel plates," IEEE Trans. Nucl. Science 35:348 (1988).*

* cited by examiner

Primary Examiner—Constantine Hannaher
Assistant Examiner—Timothy Moran

(57) ABSTRACT

The invention concerns a device and method for two-dimensional imaging and timing of particles or electromagnetic radiation with improved pulse-pair resolution. A detector, e.g. a michrochannel plate detector with a delay-line anode with three or more conductive members is used as exemplary embodiment for achieving these requirements. Redundant position and timing information is used for uniquely determine the timing and position of two or more particles, even if they arrive at the same time at the detector.

29 Claims, 8 Drawing Sheets

DEVICE AND METHOD FOR TWO-DIMENSIONAL DETECTION OF PARTICLES OR ELECTROMAGNETIC RADIATION

The present invention relates to a device and method for two-dimensional detection of particles or electromagnetic radiation in single event mode.

The present invention relates to a device and method for two-dimensional detection of particles or electromagnetic radiation in single event mode. The present invention relates to a device and method for two-dimensional detection of particles or electromagnetic radiation in single event mode.

Two-dimensional imaging of microscopic particles or electromagnetic radiation is of increasing interest in fundamental and industrial research. For example, in metallurgy and materials science, two-dimensional imaging is used to derive information on the microstructure of a material.

A microscopic particle can be an electron, an atom, a molecule, an ion, or the like. As used herein, the term particle is also intended to encompass electromagnetic radiation (in general electromagnetic radiation behaves as a photon having particle-like properties when detected).

It is necessary for many applications to not only detect whether there is a particle, but also to determine the two-dimensional position of the particle. Photographic film has been used to record two-dimensional images of such particles for many decades, for example in the field of field ion microscopy (FIM). The use of video-cameras including CCD-chips for such two-dimensional imaging is also well-known.

Furthermore, for many applications it is necessary to measure the two-dimensional position and the time when the microscopic particle is detected. So called time-of-flight methods measure the time difference between the time when the primary microscopic particle is created in a reaction or emitted from a substrate and the time when the particle hits the detector. For time-of-flight experiments the primary particle is usually created or emitted from a substrate by a pulsed source, for example a laser pulse or an electromagnetic pulse induced on the substrate. This pulse will be referred to as the initial pulse. The typical flight time of microscopic particles is of the order of several nanoseconds to microseconds and, consequently, a precision of the order of one nanosecond or even less needs to be achieved for the time measurement.

A position-sensitive detector commonly used for two-dimensional imaging and for time-of-flight applications is a delay-line detector. The delay-line detector includes a stack of micro-channel plates (MCP) and a delay-line anode. A MCP or a stack thereof is a position-sensitive secondary electron multiplier. A standard MCP is from about 25 to 100 mm in diameter, about 1 mm thick and comprises hundreds of thousands or even millions of pores. A voltage of about 1000 V is applied over each MCP. When a primary incident particle impinges in one of the pores it starts an avalanche process by secondary electron multiplication in the pore due to the high electric field inside it. As a result of the high voltage necessary for secondary electron multiplication the MCP can only be used in high vacuum at less than about $10^{-5}$ mbar. The primary particle is converted into a cloud of about 1000 to 10000 electrons in this single pore. Several of the MCPs are stacked to increase the amplification factor. Using a stack of two or three is common for single particle detection. The MCPs are preferably mounted directly on to each other. The avalanche distributes to a few pores when reaching the second and third MCP, because the pores of different MCPs are not aligned. But the secondary electron cloud is still spatially very localised in a few of the pores. The electron cloud leaving a stack of three MCPs typically contains $10^6$ to $10^7$ electrons. The electron leaving the rear side (facing the delay-line anode) of the MCP stack is accelerated onto the anode.

An example of a delay-line anode is a crossed wire anode. A crossed wire anode typically comprises a square metallic substrate acting as a holder, four insulating ceramic rods and two metallic wires. A ceramic rod is mounted on each edge of the square metallic holder and the first wire is wound around the metallic holder on the rods in one direction (x-direction), whereas the second wire is wound perpendicular to the first one (y-direction). All wires are insulated from the metallic holder and from each other by the rods. The metallic wires form a crossed mesh with a wire distance of about 0.5 mm. The electron cloud leaving the rear side of the MCP-stack is collected by the wires being typically 100 V more positive than the rear side of the MCP-stack inducing an electromagnetic signal. The signal is propagating along each wire in both directions. Four analogue amplifiers connected to the four terminating ends of the two wires amplify the signals arriving at the four terminating ends. A timing signal is picked up at the MCP and is amplified by a fifth amplifier. In a pure imaging application, four clocks realised by time-to-digital-converter channels (TDC) are started with the signal from the MCP. Each of the TDC channels is stopped by the signal of one of the other four amplifiers. The TDC directly converts the time difference between a start and a stop signal of each channel to a digital number which can be further processed with a computer. Thus, the method yields the signal propagation times on the two wires from the position where the cloud has hit the crossed wires to the terminating ends in the positive and negative x-directions (tx1 and tx2) and to terminating ends in the positive and negative y-directions (ty1 and ty2). Knowing the mean propagation speed (v) of the signal, the two-dimensional position where the electron cloud has hit the crossed wires can be reconstructed by a simple algorithm. The position in the x-direction (x) is a linear function of the times tx1 or tx2 and the position in the y-direction (y) is a linear function of the times ty1 or ty2. The position in the x-direction is also given by the time difference $x=v/2*(tx2-tx1)$ and the position in the y-direction (y) by the difference $y=v/2*(ty2-ty1)$. The typical position resolution of such a delay-line detector is 0.1 mm and the total propagation time (T) of the signal on a wire from one terminating end to the other is typically from 30 to 100 ns. All this information is stored for each single primary particle by a computer. Thus, a delay-line detector yields the two-dimensional position of each single primary particle and not only an integrated image (as, for example, a CCD-camera does) of many particles. Such a detection method is called single event mode. However, when two particles impinge on the detector within a shorter time difference than T it may occur that a signal of the second particle arrives at a terminating end before the respective signal of the first particle due to different positions. To register such particles at all a so called multi-hit TDC is used. A multi-hit TDC registers more than one stop signal on each channel after each start signal. When first and second primary particles impinge on the detector during T, two stop signals and hence two times are registered at each of the TDC channels following the identical start pulse as before. In principle, therefore, the multi-hit TDC enables two particles to be detected with a shorter time distance than T. However, a typical multi-hit TDC has a dead time for two consecutive stop signals of about 20 ns. When the second signal arrives at a terminating end within this dead time after the first signal the second signal is lost. Whether or not this occurs depends on the time difference between the first and the second particles and on their positions. If all of the four times tx1, tx2, ty1, and ty2 are registered for each of the two particles the position of both particles can be determined uniquely as long as the particles do not arrive at the detector at the same time within the time resolution of the TDC, typically from 0.5 to 1 ns. However, if one of the four times of the second particle is lost due to dead time the position reconstruction for the respective dimension fails. The mean time difference wherein the positions of two particles can be determined is known as the mean pulse-pair resolution. Such a detection set-up has a mean pulse-pair resolution that is substantially equivalent to the dead time of the TDC, i.e. approximately 20 ns. This restricts the maximum count rate detectable for a reasonable error rate to less than 50 MHz. This is disadvantageous since for higher count rates, which would be desirable, nearly all positions of particles are lost due to dead time.

For time-of-flight applications, the situation is similar. An additional fifth TDC channel is used to register the time-of-flight. The five TDC-channels are started with the initial pulse and one of the TDC channels is stopped by a timing signal picked-up at the MCP and the other four by the signals from the terminating ends of the two wires. Therefore, the time of flight of the primary incident particle is given by the fifth TDC-channel. The typical resolution for the time-of-flight measurement is about a nano-second. In time-of-flight applications, two particles are often detected within a single pulse cycle, i.e. are created by the same initial pulse, and in this case a multi-hit TDC is used. Again, the multi-hit TDC is started by the initial pulse and the TDC registers more than one stop signal without having a new start. When a first and a second primary particle impinge on the detector after a single start pulse, two stop signals and hence two times are registered at each of the TDC channels following the identical start pulse, which are:

at the first terminating end of the first wire: tx1a and tx1b;

at the second terminating end of the first wire: tx2a and tx2b;

at the first terminating end of the second wire: ty1a and ty1b;

at the second terminating end of the second wire: ty2a and ty2b; and at the MCP pickup: tofa and tofb, where a denotes the first and b the second registered time.

Again a typical TDC has a dead time of about 20 ns for two consecutive stops on the same channel. When two particles hit the detector within a time distance of the dead time of the TDC tofb is lost. Then the time-of-flight of the second particle cannot be determined by the fifth TDC channel. However, the time-of-flight of the second particle may still be determined by the sum tx1b+tx2b=sumxb or ty1b+ty2b=sumyb. But when additionally tx1b or tx2b and ty1b or ty2b are lost due to the TDC dead time, this reconstruction fails and the time-of-flight of the second particle cannot be determined at all. When even three or more of the times tx1b, tx2b, ty1b and ty2b are lost due to the dead time, the position reconstruction also fails. Thus, the position and time-of-flight determination using such an anode also has a dead time of about the dead time of the TDC.

The situation is exacerbated in time-focussed instruments when two ions arrive with the same flight time, within the timing resolution of the TDC, typically 0.5 to 1 ns. In this case, none of the times tx1a, tx2a, ty1a, ty2a, tx1b, tx2b, ty1b, ty2b may be lost and, therefore, one achieves two x and two y positions, but it will be impossible to link the two x position measurements and the y positions to the first and second particles. In other words, it is not known which x-position belongs to which y-position. This means that neither the position of the first nor of the second particle can be determined, although all of the eight times tx1a, tx2a, ty1a, ty2a, tx1b, tx2b, ty1b, ty2b are measured.

The mean pulse-pair resolution for such a time-of-flight experiment using a common crossed wire anode is also approximately 20 ns due to the above described disadvantages of losing information when two particles arrive closely after each other.

An example of a time-of-flight device used in metallurgical and materials science research is an atom probe (AP). The atom probe is a microanalytical instrument capable of analysing solid materials at the atomic scale. Three-dimensional atom probes (3DAP) permit the elemental reconstruction of a small volume of a solid specimen with near atomic resolution. A detailed account of the atom probe and its use in the microstructural and microchemical analysis of materials is provided in *Atom Probe Field-Ion Microscopy*, M. K. Miller, A. Cerezo, M. G. Hetherington and G. D. W. Smith, Oxford University Press, 1996 and *Atom Probe Microanalysis: Principles and Applications to Materials Problems*, M. K. Miller and G. D. W. Smith, Materials Research Society, Pittsburgh, Pa., 1989, which is made part of the disclosure herewith by reference. For atom probe analysis a strong and short initial electromagnetic pulse is applied to a very sharp specimen, which will typically be formed from a metal, alloy or semiconductor material. The pulse causes an emission of primary ions from the surface of the specimen by field evaporation. A position sensitive detector is located opposite to the specimen, which detects the position and the time of the arrival of the primary ions. By the detected position, the position on the surface of the specimen from which an ion was emitted may be determined. By the time-of-flight, the charge-to-mass-ratio may be determined, and hence the ion species. Repeating the process by applying a sequence of many electromagnetic pulses allows the three-dimensional atomic structure of the specimen to be determined.

A further development of a crossed wire anode includes a first pair of wires in the x-direction and a second pair of wires in the y-direction (a general description of crossed wire anodes is provided in S. E. Sobottka and M. B. Williams, IEEE Trans. Nucl. Science 35:348, 1988, which is made part of the disclosure herewith by reference). The first wire (reference wire) of each pair is typically about 100 V more positive than the rear side of the MCP. The second wire of the same pair (signal wire) is typically about 200 V more positive than the rear side of the MCP. Thus, the electron cloud emerging from the MCP is mostly collected by the signal wire. Such a wire pair is known as a Lecher line. Using a Lecher line avoids loss of signal during propagation on the wire in a manner similar to a shielded coaxial cable. However, each wire pair forming a Lecher line forms only one signal propagation line, sufficient for the reconstruction of the spatial position in one dimension. Thus, the two perpendicular wire pairs are generally equivalent to two perpendicular single cables with respect to the position determination. Accordingly, a single wire and a wire pair both form a single signal propagation line.

Other delay-line anodes use two printed metallic circuits or other two signal propagation lines to collect the electron cloud and propagate the induced signal instead of the crossed wires.

All of the above delay-line anodes have the disadvantage with respect to pulse-pair resolution, since the general method for the position determination is equivalent.

This disadvantage also applies to multi-wire detectors such as those used in position-sensitive avalanche detectors used for nuclear experiments (see A. Breskin, Nucl. Inst. and Meth. 196 (1982) 11) since these also use two sets of parallel wires to determine the x and y ordinates independently.

In the separate field of molecular ion structure analysis, the problem of ambiguities for determining positions of particles arriving simultaneously has been considered by W. Koenig et al., Nuclear Instruments and Methods in Physics Research B10/11 (1985) 259–265, Elsevier Science Publishers B. V. Koenig et al. propose using three sets of parallel wires, which requires a total of 870 signal connections. It will be appreciated that such an arrangement would not be practical for a vacuum detector as used in, for example, an atom probe microanalyser. 870 preamplifiers are also required and this means that the design is very complex and costly. Koenig et al. are, furthermore, not concerned with the issue of improving multi-hit properties and mean pulse-pair resolution.

Therefore, it is an object of the present invention to provide a device and delay-line anode and a method for detecting the position and/or the time of particles with improved multi-hit properties and/or improved mean pulse-pair resolution.

Accordingly, the present invention provides a device for detecting the position of a particle comprising a delay-line anode which comprises at least a first, second and third non parallel conductive members for receiving electromagnetic pulses each of the conductive members forming a propagation line for electromagnetic signals and each of the conductive members having a first and second terminating end at least some providing a propagated signal to analysing electronic circuits.

The device according to the present invention may be used as a vacuum detector in an atom probe instrument for microstructural and microchemical analysis of materials, such as metals, alloys and semiconductors or in a recoil ion or recoil electron momentum analyser (COLTRIMS). A detailed description of COLTRIMS can be found in Volker Mergel, PhD-thesis University Frankfurt, "Dynamische Elektronenkorrelationen in Helium", Shaker-Verlag, 1996, ISBN 3-8265-2067-X which is made part of the disclosure herewith by reference.

The present invention also provides a method for detecting the spatial position of an electromagnetic pulse, which method comprises the following steps:

(a) providing at least a first, second and a third conductive member (4a, 4b, 4c) having each a first and second terminating end;

(b) receiving the electromagnetic pulse on a portion (30) of said first, second and/or third conductive members (4a, 4b, 4c);

(c) propagating said electromagnetic pulse on said conductive members (4a, 4b, 4c); and (d) determining the local position of said portion (30) of said first, second and/or third conductive members by measuring the time of the arrival of said electromagnetic pulse at said first and/or second terminating ends.

The method according to the present invention may be applied to the microstructural and microchemical analysis of materials, such as metals, alloys and semiconductors.

The device and method according to the present invention result in a mean pulse-pair resolution which is significantly smaller than that associated with the prior art crossed wire delay-line anode.

The device according to the present invention preferably comprises a delay-line anode including three or more longitudinally extended conductive members which are not parallel to each other, each member having two terminating ends and capable of yielding redundant position information. The conductive members will typically be a signal propagation line, for example a single wire or a wire pair, preferably metallic wires. The conductive members are provided to receive an electromagnetic pulse, whereby the pulse is propagated along the conductive members in the direction of the two terminating ends thereof.

Two non-parallel conductive members are used to determine the two-dimensional position of the induced signal on the anode. Therefore, at first sight it appeared superfluous and, therefore, absurd to provide more than those two conductive members. However, it has surprisingly been found by the inventors that the additional and redundant position information resulting from those third or more additional conductive members can be used for a significant and advantageous improvement of the mean pulse-pair resolution of the device.

The further description of the device according to the present invention is restricted to three conductive members for the sake of clarity. It will, however, be appreciated that it is also advantageous to use four, five, or even more conductive members, yielding even more redundant information, being especially advantageous when more than two particles are detected.

In a preferred embodiment, the device according to the present invention comprises a stack of MCPs and the electromagnetic signal induced on the conductive members is caused by an electron cloud leaving the stack of MCPs after a primary incident particle has impinged on the stack of MCPs. Each conductive member is longitudinally extending and preferably comprises a metallic wire. The signal is propagated along the conductive members in both directions to the terminating ends. Preferably, an amplifier is assigned to each of the terminating ends of the conductive members for amplification of the induced signal. Preferably, a discriminator, for example a constant-fraction-discriminator, is used for precise timing of the signals. A stop channel of the TDC is preferably assigned to each of the discriminators registering the time between a given start pulse and the output signal from the constant-fraction-discriminator.

In a preferred embodiment for 2-dimensional imaging without flight-time measurement, a multi-hit TDC with at least six channels is used, started with the pickup from the MCP. The three conductive members yield the respective times for two consecutive induced signals by two primary particles ("a" indicates the first TDC stop signal and "b" indicates the second TDC stop signal, "1" indicates the first terminating end of a conductive member and "2" indicates the second terminating end):

$tx1a$, $tx1b$, $tx2a$, $tx2b$ at the first conductive member;

$ty1a$, $ty1b$, $ty2a$, $ty2b$ at the second conductive member; and $tz1a$, $tz1b$, $tz2a$, $tz2b$ at the third conductive member.

The position of the induced signal is determined by the time differences at opposite terminating ends of the same wire:

$xa = vx^*(tx1a-tx2a)$, $ya = vy^*(ty1a-ty2b)$ and $za = vz^*(tz1a-tz2a)$ for the first particle; and $xb = vx^*(tx1b-tx2b)$, $yb = vy^*(ty1b-ty2b)$ and $zb = vz^*(tz1b-tz2b)$ for the second particle, where $vx$, $vy$ and $vz$ are the mean signal propagation velocities on the respective conductive members.

Each one of the coordinates xa, ya, and za is linearly dependent from the two others as well as each one of the coordinates xb, yb, and zb is linearly dependent from the two others. Therefore, each two of xa, ya, and za and each two of xb, yb, and zb are enough to determine the two-dimensional position of each particle. Thus, even if one of the times of the second particle is lost, the position of both particles is determined. Even if two particles are impinging on the detector at the same time there is a large probability, due to the propagation time on the conductive members, that at least two of the three time differences xb, yb and zb of the second particle will be detected.

Surprisingly, it has been found that the mean-pair resolution can be improved by a factor of up to ten compared with the prior art crossed wire anode for a given error rate. The maximum detection rate for a given error rate is therefore improved by a factor of up to 10 with the device according to the present invention compared with a conventional crossed wire delay-line detector.

In a preferred embodiment for a time-of-flight application, a multi-hit TDC with at least seven channels is used, started with the initial pulse. A primary particle impinging on a stack of MCPs is converted into a cloud of electrons inducing an electromagnetic signal on the conductive members. Six of the seven channels are stopped by the signals arriving at the six terminating ends of the three conductive members and the seventh is stopped by the MCP pickup signal. The three conductive members yield the respective times for two consecutive induced signals by two primary particles ("a" indicates the first TDC stop signal and "b" indicates the second TDC stop signal, "1" indicates the first terminating end of a conductive member and "2" indicates the second terminating end):

tx1a, tx1b, tx2a, tx2b at the first conductive member;
ty1a, ty1b, ty2a, ty2b at the second conductive member;
tz1a, tz1b, tz2a, tz2b at the third conductive member, and
tofa and tofb at the MCP pickup.

Even if, for example, tofb, tx1b and ty1b are lost, the geometry of the delay lines mean that it is very likely that tz1b and tz2b are still detected and the time-of-flight of the second particle can be reconstructed by sumzb=tz1b+tz2b. It is very unlikely to lose also sumzb in so far as it is much more unlikely to lose three sums than only two. Thus, for many pairs of particles impinging on the detector the dead time is significantly reduced.

With this method and a detector according to the present invention a mean pulse-pair resolution of approximately 10 ns or less, preferably approximately 5 ns or less, more preferably approximately 2 ns or less can be achieved.

In the case of ions arriving with identical flight times, where a prior art crossed wire anode cannot provide any position or time-of-flight for any particle, the device according to the present invention provides the two-dimensional positions and time-of-flight of both particles uniquely. When the two particles are spatially separated enough the times: tx1a, tx1b, tx2a, tx2b, ty1a, ty1b, ty2a, ty2b, tz1a, tz1b, tz2a, tz2b can be measured yielding unique x and y positions for each ion. Also the time-of-flight of both particles is known by, for example, sumxa=tx1a+tx2a. In this case, even a pulse-pair resolution of zero can be achieved.

In a preferred embodiment the conductive members comprise a pair of conductors, preferably metallic wires forming a Lecher line for better signal transmission on the lines. The wires are preferably wound around a metallic base plate and are supported by a dielectric, preferably in the form of ceramic rods. One conductive member of each pair is preferably about 100 V more positive than the rear side of the MCP stack, and the other one about 200 V more positive. Differential amplifiers are preferably used for the amplification of the signals arriving at the terminating ends of the conductive members. A differential amplifier includes two inputs and the difference signal between the two inputs is amplified. Advantageously, any noise on the wires is suppressed.

It is advantageous to determine the position by the time differences for example tx1a–tx2a or tx1b–tx1b whenever possible because this exploits the resolution of each of two TDC-channels. Using the time difference may therefore improve the detector resolution by up to a factor of two.

Preferably, the position of one or more primary particles is determined in two dimensions for two-dimensional imaging. In a preferred embodiment an MCP or stack of MCPs is used to convert the primary particles into clouds of electrons inducing signals on the conductive members. A gas proportional avalanche chamber may be also used in the conversion stage.

It is advantageous to determine the time-of-flight preferably by calculating the time sums, for example sumxa=tx1a+tx2a and/or sumxb=tx1b+tx2b, yielding the time-of-flight of the first and second primary particles, respectively. A triple redundancy is achieved by the three conductive members in the x, y and z-directions.

In a preferred embodiment of the present invention a high resistance layer is located between the conductive members and the MCP stack. Preferably, the electron cloud of the MCP is collected by the high resistance layer causing capacitively induced signals on the conductive members. In this case, the MCP stack and the high resistance layer can be inside the vacuum and the conductive members can be outside the vacuum divided by a dielectric wall through which the electromagnetic signals are coupled.

In another preferred embodiment three conductive members are provided with an angle of 60° or substantially 60° between each other.

In yet another preferred embodiment the conductive members are printed on a dielectric substrate like a printed circuit board for cheap and simple production.

In a further preferred embodiment a fluorescent screen, preferably a phosphor screen, is provided adjacent the conductive members for creating scintillation light optically visualising the two-dimensional position of the electromagnetic pulse. The secondary scintillation light may be used to further improve multi-hit properties by providing position information when the particle impacts lie within the pulse-pair resolution of the delay-line anode. A CCD-camera or CCD-chip is advantageously used to directly image the scintillation light. An electrically isolated grid is advantageously disposed between the electrically isolated phosphor screen and the conductive members. Preferably the clouds of electrons generated by the impact of the primary particle are accelerated before impact on the phosphor screen to increase the output of secondary scintillation light.

The present invention will now be described further, by way of example, with reference to the accompanying drawings in which.

Figure 1:
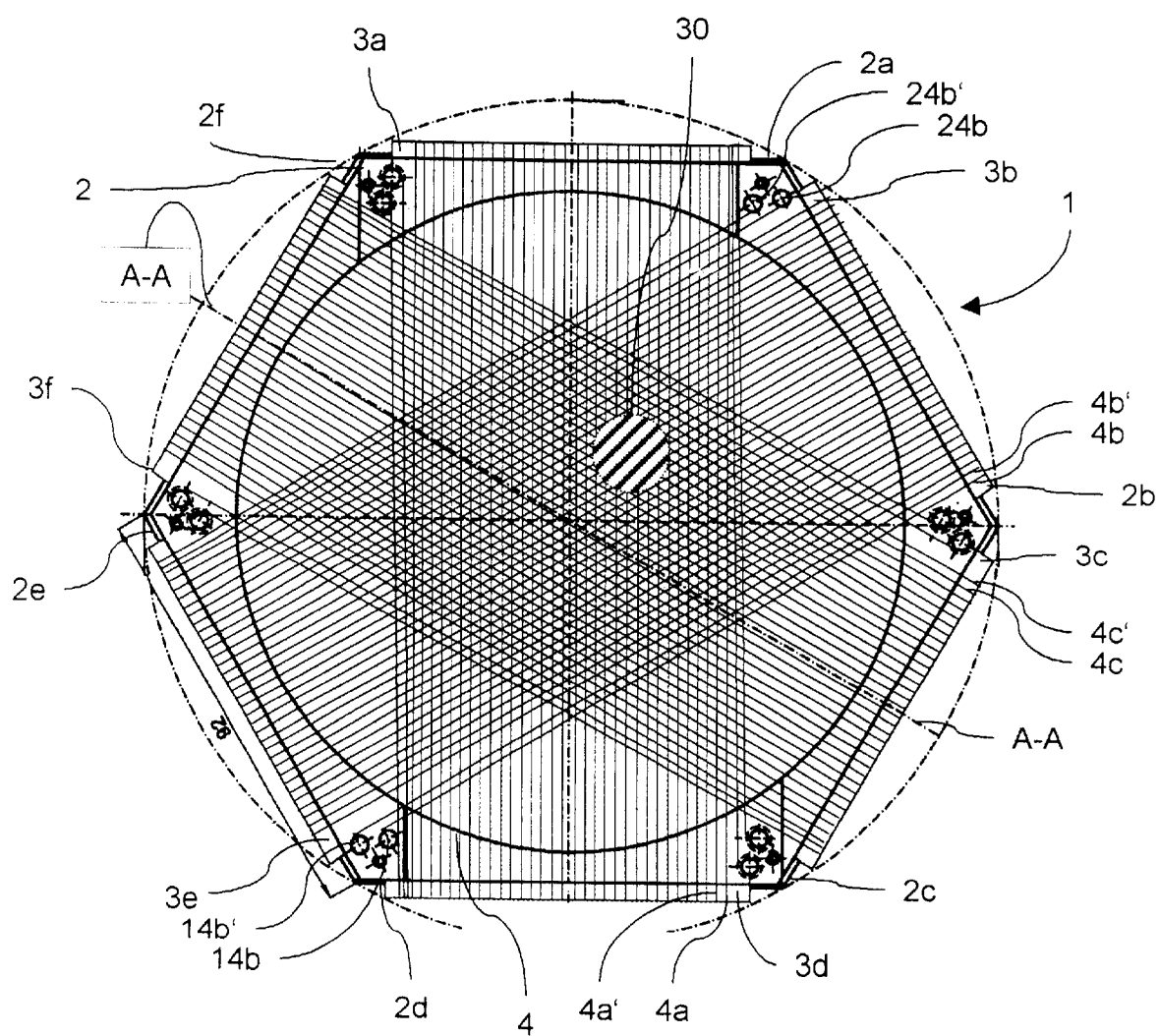
FIG. 1 shows a top view of a delay-line anode according to the present invention.
Figure 3:
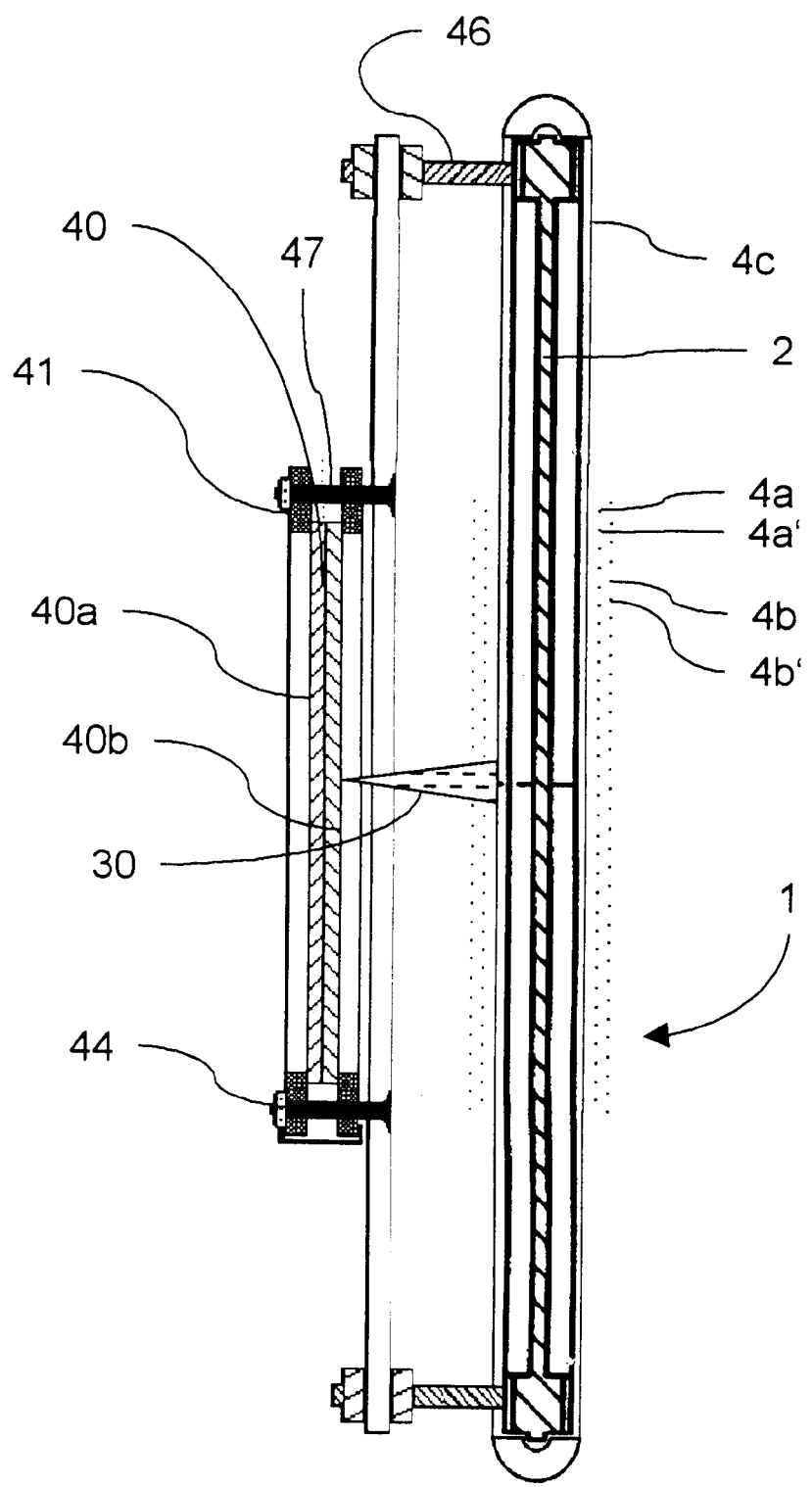
FIG. 3 shows a sectional view along line A—A of the detector of FIG. 2.

FIG. 1 shows a first exemplary embodiment of a delay-line anode 1 according to the present invention using a crossed wire technique. The anode 1 comprises a metallic holder plate 2, which is preferably made of stainless steel, aluminium or a copper alloy. The holder plate is uniformly hexagonal having six edges 2a to 2f. On each of the edges 2a to 2f a ceramic rod 3a to 3f is mounted, respectively. The six ceramics rods 3a to 3f preferably have groves (not shown) to fix six metallic wires 4a, 4a', 4b, 4b', 4c, 4c' forming three wire pairs 4a and 4a', 4b and 4b', 4c and 4c', respectively. The wire pairs 4a and 4a', 4b and 4b', 4c and 4c' are wound around the holder plate 2 and are supported by the ceramic rods 3a and 3d, 3b and 3e, 3c and 3f, respectively, which are located at opposite edges 2a and 2d, 2b and 2e, 2c and 2f, respectively of the holder plate 2, thus providing a mesh-like covering on a portion of the front side (shown side) and the rear side (not shown) of the holder plate 2. Each wire pair is wound around the holder in a way that going perpendicular to wire first comes the wire 4a then 4a', 4a, 4a' and so on. All wires are insulated from each other and from the holder plate. Each wire has two terminating ends, which are fixed and electrically connected by metallic screws going through the holder plate 2 being insulated from the holder plate by ceramic tubes (not shown). For example, the two terminating ends of the wire 4b are fixed by screws 14b and 24b, respectively, the two terminating ends of the wire 4b' are fixed by the screws 14b' and 24b', respectively. The wires 4a and 4a', 4c and 4c' are fixed in the same manner. The wires are be contacted easily at the screws to extract signals induced on the wires. Thus the anode has twelve of said screws to fix the twelve terminating ends of the six wires 4a to 4c'. In the inner part of the anode the three wire pairs cross over each other, but do not contact each other, being in different planes as shown in FIG. 3. This is because ceramic rods 3a and 3d are of a first diameter, rods 3b and 3e are of a second diameter and rods 3c and 3f are of a third diameter, the first, second and third diameters bring sufficiently different. The ceramic rods may preferably be made from aluminium oxide or the like. The holder plate 2 has a round hollow 4. The screws can be used to contact the anode wires by cables, typically twisted pair cables (not shown), which cables typically go to a vacuum flange (not shown) from which the signals are transmitted to the processing electronics (not shown). When a cloud of electrons 30 hits a portion of the wires of the anodes the induced electromagnetic signal is propagating with a velocity close to the speed of light on each wire pair to the respective terminating ends, and from there by the cables through the vacuum flange to the signal processing electronics, which may include amplifiers, discriminators and TDC channels. Each wire pair serves as one signal propagation line wherein the wires 4a, 4b, and 4c are put on a more positive voltage than the wires 4a', 4b' and 4c'. Therefore the electron cloud 30 is mainly collected by the wires 4a, 4b, and 4c, which are called signal wires, wherein the wires 4a', 4b' and 4c' are called reference wires.

Figure 2:
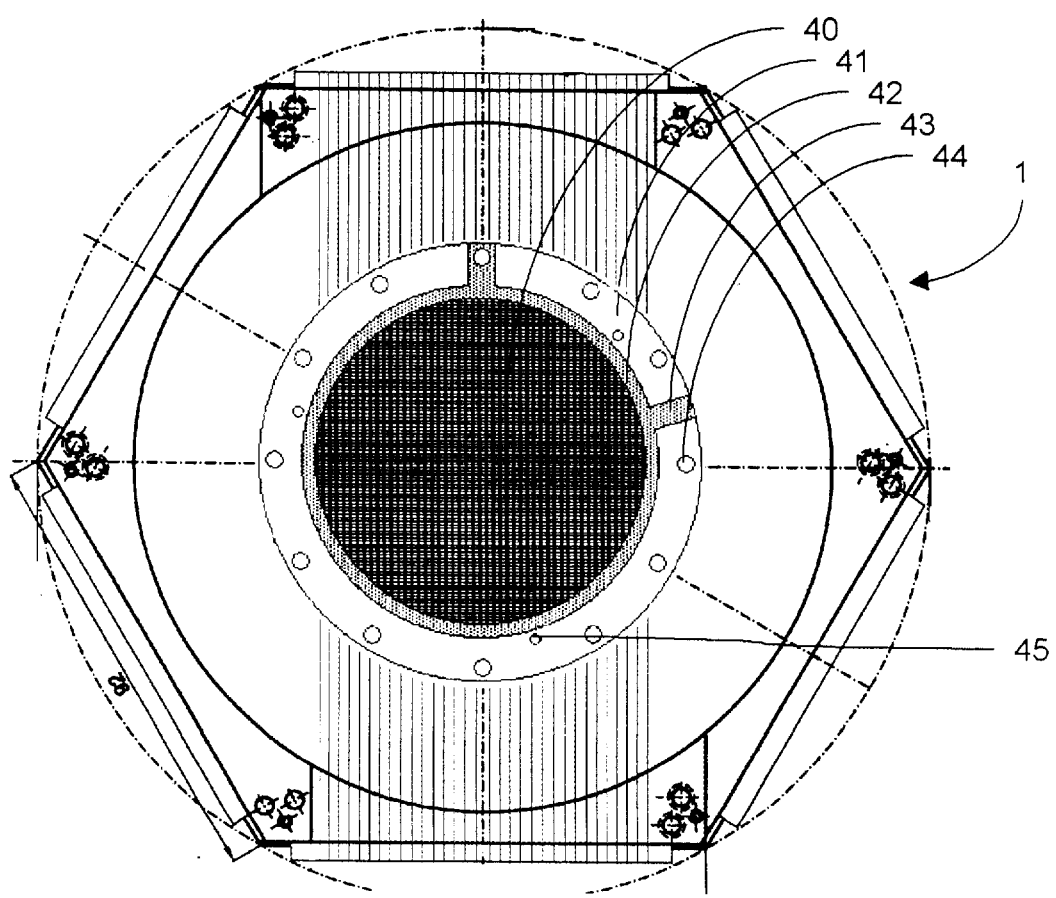
FIG. 2 shows a top view of a detector with the delay-line anode of FIG. 1 and a stack of micro-channel plates.

FIG. 2 shows the delay line anode of FIG. 1 together with a stack of MCPs 40. Two MCPs are held between two ceramic rings 41. The ceramic rings 41 are partially coated with nickel to contact the MCPs. The nickel coating 42 has strips 43 for fixing contacting cables (not shown) by clamping, screwing, soldering or the like. The ceramic ring 41 has outer holes 44 and three inner holes 45. The outer holes are used to screw the two rings together to press the rings to the MCPs and the MCPs on to each other (see FIG. 3). Glass balls (not shown) can be put between the two ceramic rings in the inner holes, wherein the glass balls are larger than the holes and act as spacer between the ceramic rings. The delay-line anode is shown with only one signal line for simplicity.

FIG. 3 shows a sectional view along the line A—A of the device shown in FIG. 2. The anode 1 holds the ceramic rings 41. The wire of the wire pair 4c, 4c' (4c' is not shown) is wound around the anode and the ceramic rings. The wire pairs 4a, 4a' and 4b, 4b' are cut and it can be seen that the three wire pairs are spaced apart from each another and do not make electrical contact with each another. A base plate 10 is fixed to the anode holder by screws 46. These screws 46 are preferably made of an insulating material, such as plastic or a ceramics or the like so as to enable applying different voltages on the anode holder and the base plate. The base plate acts as holder for the ceramic rings which fix the stack of MCPs 40, which is exemplary done by screws 47 here. The screws 47 hold the ceramic rings at the base plate and also fix the MCPs 40 between the two ceramic rings. Fixing the MCPs 40 between the ceramic rings 41 can alternatively or additionally be done by clamps or the like. Two MCPs are shown here as an example. The electron cloud 30 emerging from the rear side 40b of the MCPs 40 is travelling to the delay-line anode and expanding during flight. Then the cloud 30 is collected mainly by the signal wires 4a, 4b, 4c.

Figure 4:
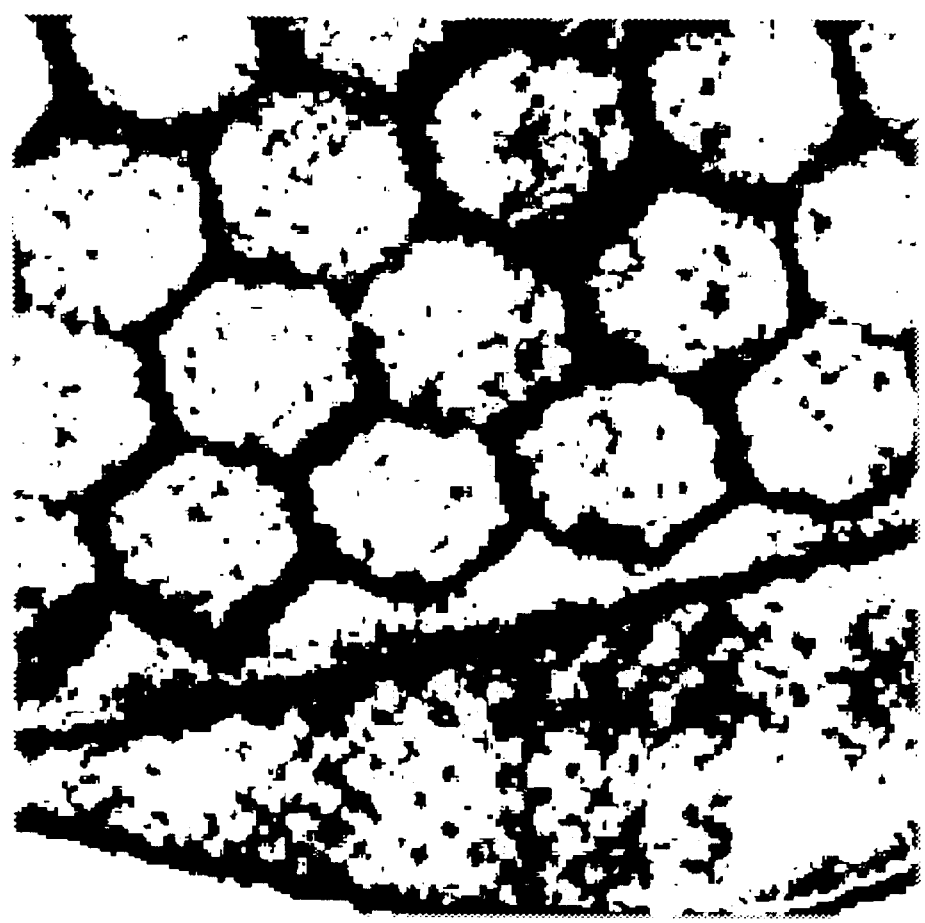
FIG. 4 shows a two-dimensional image of a shadow mask taken with the detector of FIG. 2.

FIG. 4 shows a two-dimensional image taken by the device illustrated in FIGS. 2 and 3. The following voltages were applied on the parts of the device:

the front side 40a of the MCPs 40: −2 kV;

the rear side 40b of the MCPs 40: +0 V;

the signal wires 4a, 4b, 4c: +200 V;

the reference wires 4a', 4b', 4c': +100 V; and holder plate 2: +0 V

The MCP was illuminated for 1 hour by an alpha-source and a mesh with hexagonal apertures was mounted between the source and the MCPs, close to the MCPs. FIG. 4 shows an integrated positive image (the dark areas mean less intensity).

Figure 5:
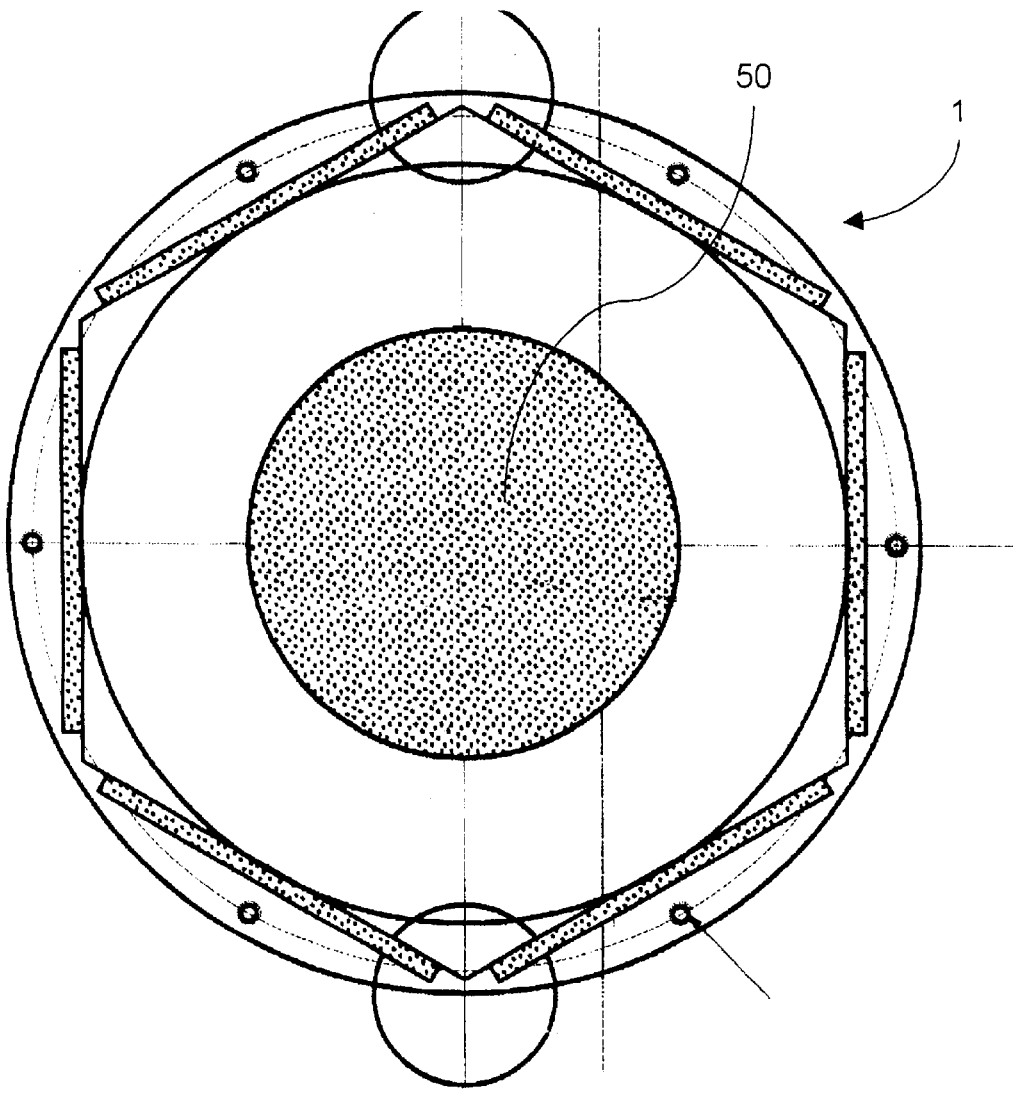
FIG. 5 shows a sectional view of a second delay-line anode according to the present invention with a phosphor screen.

FIG. 5 shows a section through a delay-line anode including a phosphor screen 50 before mounting the ceramic rods 3a to 3f and before winding the signal lines 4a, 4a', 4b, 4b', 4c, 4c' around the anode. An aperture which is nearly as large as the phosphor screen is located in the centre of the holder plate 2. Therefore the screen 50 can be seen from both sides of the anode through the signal lines. A grid is glued on said aperture. The phosphor screen 50 is held between two metal rings by screws. The phosphor assembly is supported on the holder 2 by screws and electrically isolated by ceramic spacers to enable different voltages to be applied on the phosphor 50 and on the holder 2. A screw is provided to allow electrical connection to the phosphor screen 50 via a wire (not shown). For this embodiment, the potential of the phosphor screen may be held at a high voltage, preferably +500 V to +5 kV relative to the rear side 40b of the MCP, to improve the efficiency of generation of scintillation light. The scintillation by the phosphor screen and the operation of the delay-line anode can function at the same time and the rear side of the phosphor screen can be seen during operation of the MCPs. Multi-hit properties of the detector can be further improved if a CCD camera or CCD chip is used to image secondary scintillation from the phosphor screen and hence provide additional position information.

Figure 6:
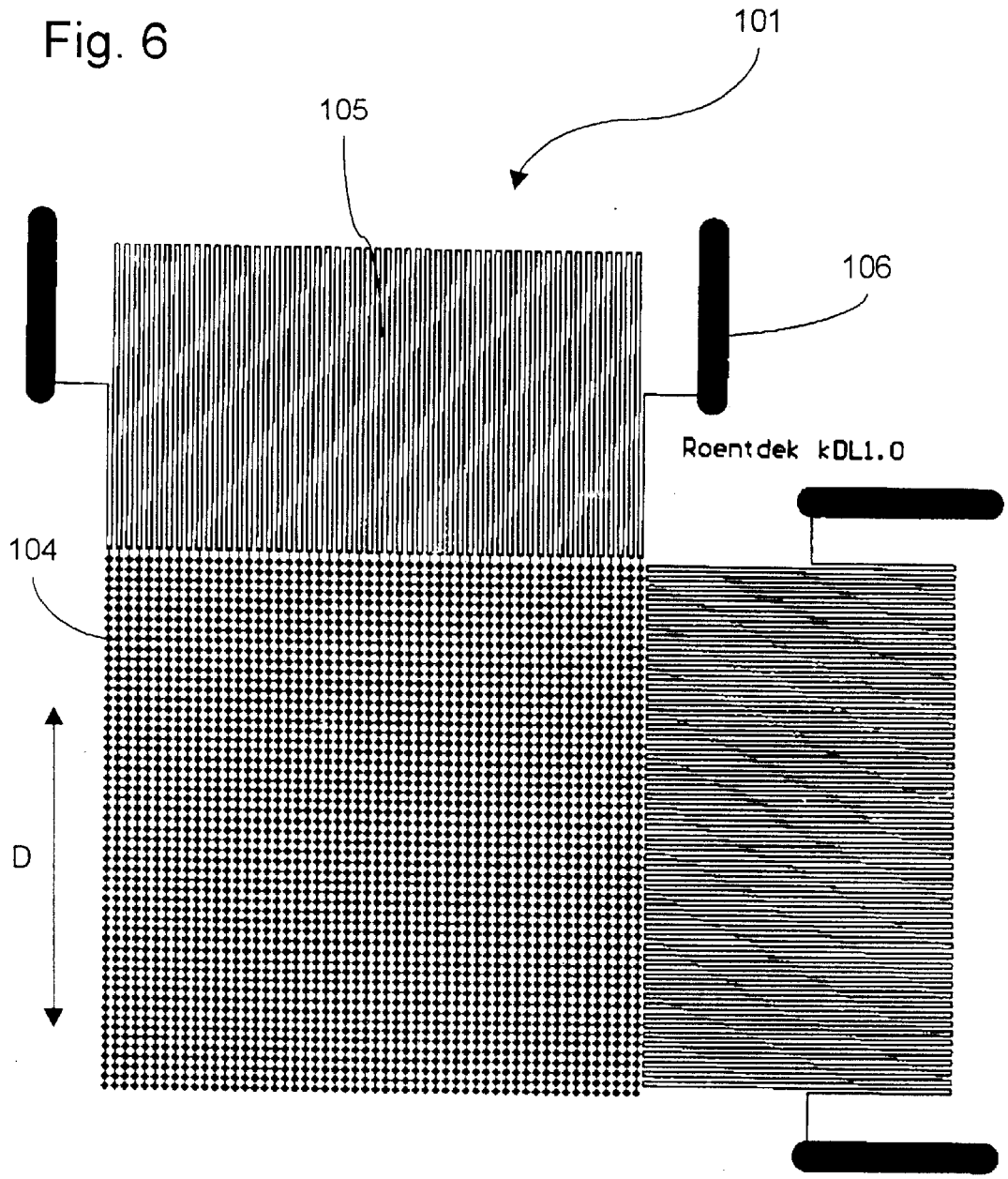
FIG. 6 shows a top view of conductive members of a third delay-line anode according to the present invention.

FIG. 6 shows an alternatively embodiment of a component of a delay-line anode 101. Little square formed conductive members 104 are shown, which are electrically connected in one direction indicated by the arrow D. At the edge of the anode, meander formed conductors 105 are provided creating additional delay for the signal propagation. Contact pads 106 are provided for connecting a cable or the like. The conductive members are printed on 50 micron polyimid foil and the foils are put on top of each other by an angle of 60° between the direction of the connection between the squares. Then the conductive members are receiving the image charge of the electromagnetic pulse.

The advantages of the device and method according to the present invention are described in the following section by an exemplary comparison of the differences between the prior art delay-line anode with signal lines and the preferred embodiment shown in FIGS. 7 and 8.

Figure 7:
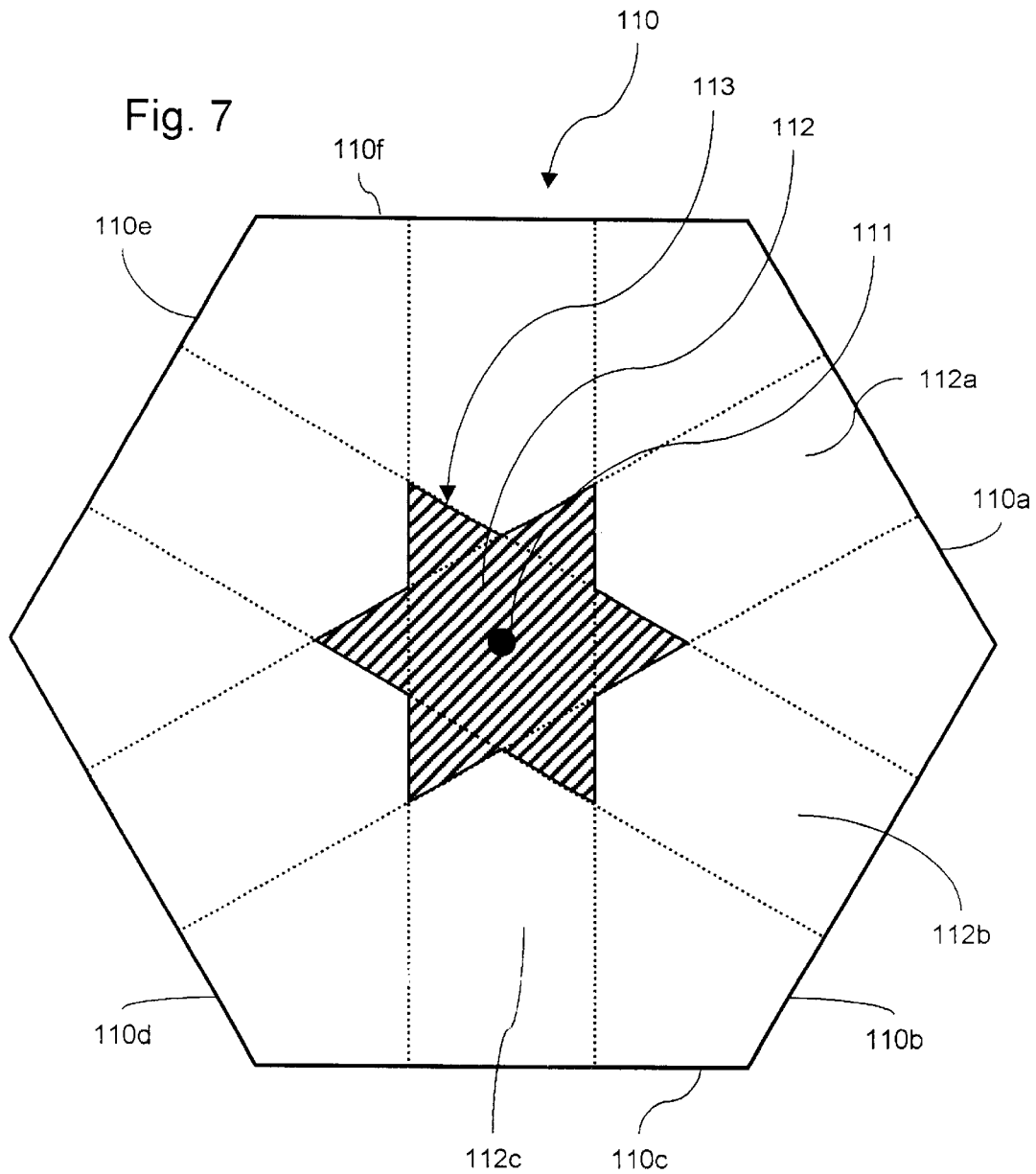
FIG. 7 shows a position diagram of the delay-line anode of FIG. 1.

FIG. 7 shows the dead area for the delay-line anode 110 of FIG. 1 of about 140 mm diameter. For the sake of simplicity only the hexagonal form of the anode (no constructional element) is shown. The anode includes a first, second and third wire pairs (not shown) defining a first, second and third conductive members, respectively. The first wire pair is perpendicular to the edges 110a and 110d, the second wire pair is perpendicular to the edges 110b and 110e and the third wire pair is perpendicular to the edges 110c and 110f.

First and second electrons are created by double photo-ionization of helium by absorption of a single photon by synchrotron radiation. The light pulse of the synchrotron source has a duration of below 100 ps which can be treated as infinitely small. The simultaneous emission of the two electrons defines the time $t_0=0$. The first and second electrons hit a stack of three MCPs mounted above the delay-line anode 110 after the individual time-of-flights tofa and tofb. The constant time for the secondary electron amplification in the MCP-stack and drift time from a MCP-stack to the anode can be disregarded for these considerations, it is short anyway. First and second electron clouds are created by the MCP-stack. The two-dimensional position of a first electron cloud 111 is illustrated in the centre of the detector, by way of example.

Seven differential amplifiers were used to amplify the signal coupled from the MCP-stack front side and the arriving signals at each two ends of each wire pair. The timing of the amplified signal was precisely taken by a constant-fraction-discriminator. We used two amplifier-constant-fraction-modules DLATR4 from RoentDek GmbH, Germany. Seven TDC channels of a 32-channel TDC (LeCroy 3377) were used. The LeCroy 3377 TDC manual indicates 20 ns dead time for each channel, but we achieved only about 11 ns dead time. All TDC channels were started by the initial somehow delayed synchrotron machine signal. Those skilled in the art are familiar with this concept of precise time-measurement. The following times were measured (if not lost by dead time) by the TDC-channels:

| Channel 1: | tx1a, tx1b at the first terminating end of the first wire pair; |
|---|---|
| Channel 2: | tx2a, tx2b at the second terminating end of the first wire pair; |
| Channel 3: | ty1a, ty1b at the first terminating end of the second wire pair; |
| Channel 4: | ty2a, ty2b at the second terminating end of the second wire pair; |
| Channel 5: | tz1a, tz1b at the first terminating end of the third wire pair; |
| Channel 6: | tz2a, tz2b at the second terminating end of the third wire pair; and |
| Channel 7: | tofa, tofb at the MCP front, | where a and b denote the first and second signals arriving at the TDC inputs, respectively.

The first, second and third wire pairs are perpendicular to the first 110a, 110d, second 110b, 110e and third 110c, 110f pair of detector edges.

Now we illustrate an exemplary event, where both electrons arrive at the detector at the same time, i.e. tofa=tofb and the first electron 111 hits the detector at the centre. However, the time-of-flight of the second electron can still be reconstructed by one of the time sums: sumxb=tx1b+tx2b, sumyb=ty1b+ty2b or sumzb=tz1b+tz2b. Thus, only one of these is enough to easily reconstruct tofb, for example as tofb=sumxb/2−Tx, where Tx is the total signal propagation time from the first to the second terminating end of the first wire pair. For the y- and z-directions it reads accordingly to fb=sumyb/2−Ty and tofb=sumzb/2−Tz. The three bars 112a, 112b and 112c subtended by the dotted lines correspond to the electronic dead time. Consequently, for example, if the second electron hits the detector within the bar 112a, tx1b and tx2b are lost and consequently sumxb is lost. Thus, tofb can be reconstructed, when the second electron hits the detector outside the hexagon 112.

For determining two linearly independent position components of the second electron at least two times being from different wire pairs shall be detected. This can be, for example, tx1b and ty1b or any other pair of signal times which are not from the same wire pair. The fact that the two position components are not perpendicular to each other is not a problem, as long as they are linearly independent, i.e. the wire pairs are not parallel. Therefore, having 60° between each of the wire pairs (as shown here) is a preferable but not necessary configuration. The Cartesian coordinates can easily be calculated by trigonometric functions.

However, having two position components of each of the first and second electrons is still not enough to determine the two-dimensional position of both first and second electrons. This information yields four position components xa, xb and ya, yb, but one does not know which two belong together, i.e. one cannot know if the first electron has position (xa, ya) and the second electron has (xb, yb) or if the true combination is (xa, yb) and (xb, ya). This is due to the fact that one does not a priori know if the secondly measured times indicated by the "b" belong to the second electron, because signals from an earlier electron can arrive later at a terminating end due to different positions. To decide which of the two possibilities is the true one, one additionally needs the time sums, sumxb and sumyb.

When tx1a, tx1b, ty1a, ty1b, tx2a, tx2b, ty2a and ty2b are measured one calculates the time sums for both combination possibilities, i.e. sumxa'=tx1a+tx2a and sumxb'=tx1b+tx2b or sumxa"=tx1a+tx2b and sumxb"=tx1b+tx2a. For the y-direction one proceeds accordingly, i.e. sumya'=ty1a+ty2a and sumyb'=ty1b+ty2b or sumya"=ty1a+ty2b and sumyb"=ty1b+ty2a. Thus, one receives for both x- and y-directions two combination possibilities, the first one indicated by the prime and the second one indicated by the double prime. For the x- and y-directions one additionally knows that the true time sums for the same electron must be identical, since the true time sum is twice the time-of-flight plus the constant total propagation time on the wire pair (Tx, Ty or Tz) and the half the time sum of the first arriving electron minus the respective total propagation time is equal to the measured tofa at channel 7. Accordingly, one can decide for each of the sumxa, sumxb, sumya and sumyb if the single or double primed solution is the true one and which one belongs to the first and second arriving electrons. If, for example, the sumxa", sumxb", sumya"and sumyb" are the true combinations, one calculates the true time-of-flights tofa=sumxa"/2−Tx=sumya"/2−Ty and tofb=sumxb"/2−Tx=sumyb"/2−Ty.

The true positions xa, ya, xb and yb of the two electrons are computed accordingly as:

xa=vx*(tx1a−tx2b);

xb=vx*(tx1b−tx2a);

ya=vy*(ty1a−ty2b); and yb=vy*(ty1b−ty2a).

Now, one knows uniquely that tofa, xa and ya belong to the first electron, and tofb, xb and yb belong to the second electron, resulting in the desired tuples time-of-flight and two-dimensional position of each single particle hitting the detector.

Accordingly, the time-of-flight and the two-dimensional position of at least two particles can be determined, even if they both hit the detector at exactly the same time, as long as the second particle impinges on the detector outside a star-formed dead area 113 around the first particle formed by the overlap area of at least two of the three dead-time bars 112a, 112b and 112c.

Figure 8:
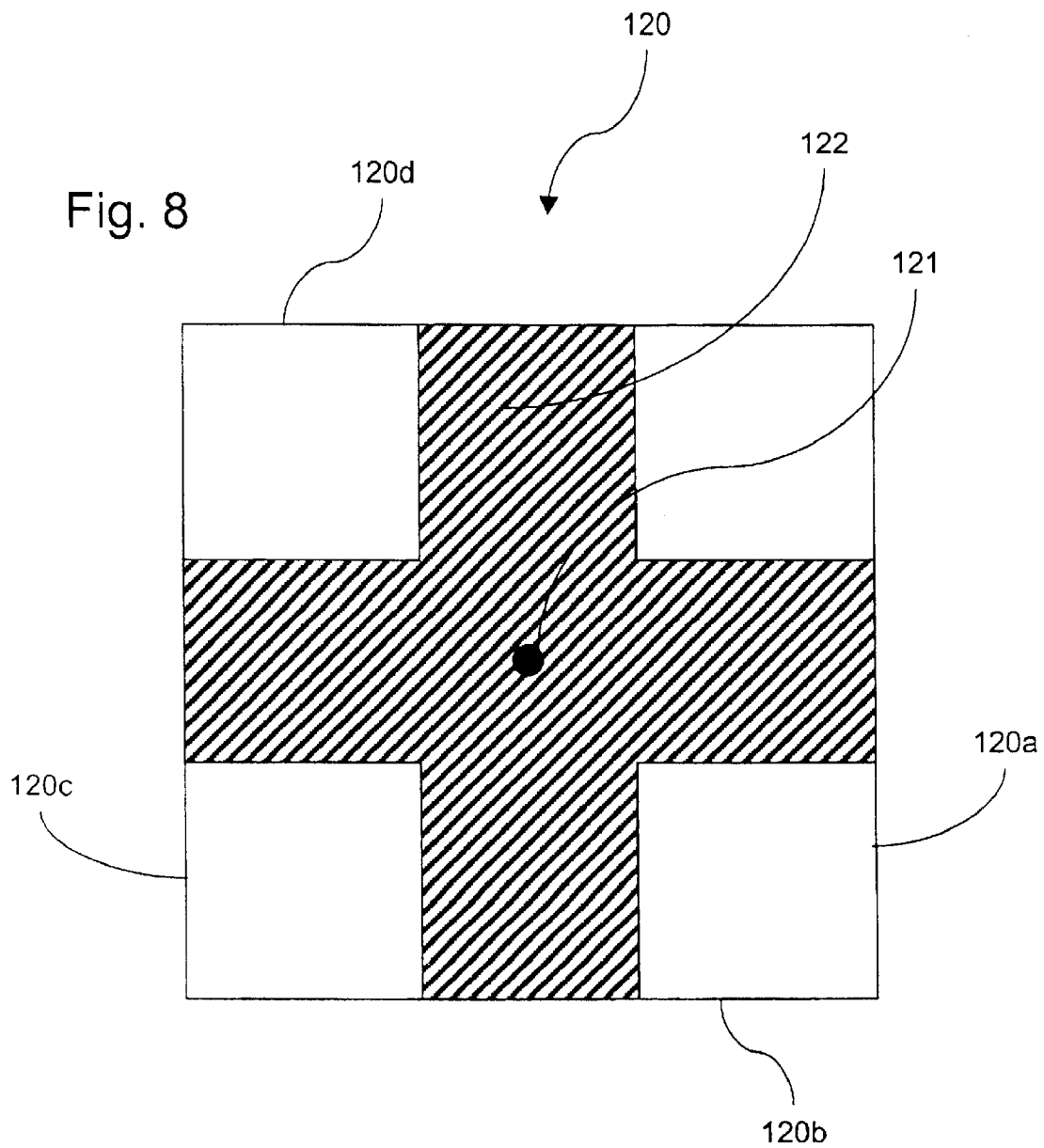
FIG. 8 shows a position diagram of a prior art delay-line anode.

FIG. 8 shows a schematic drawing of a prior art square delay-line anode 120 of about 80 mm×80 mm size. The anode was used for the same experiment as the anode according to the present invention.

The position of a first electron 121 is shown in the centre of the anode 120. A first and second wire pair (not shown) is parallel to the edges 120a, 120c and 120b, 120d, respectively. When the second electron hits the detector, time-of-flight and the position of the second electron can only be determined when the second particle arrives at the detector either:

- at least after a time which is larger than the electronic dead-time of about 11 ns to 20 ns, depending on the TDC used; or
- at least after a time which is larger than the resolution of tofa−sumxa/2−Tx, which is some kind of internal timing resolution of the detector, typically from about 1 to 2 ns full width half maximum (FWHM), and the second electron must arrive outside the cross-shaped area 122.

Accordingly, the conventional prior art anode cannot resolve particles with a time difference smaller than typically 1 to 2 ns, but even if the time difference is larger than that, the area 122 in which the position or time information of the second particle (in some cases even additionally of the first particle) is lost, is considerably larger than with the delay-line anode according to the present invention.

Thus, the general multi-hit properties and the pulse-pair resolution are improved by the anode according to the present invention compared with the conventional prior art anodes.

The multi-hit properties can be further improved by using a phosphor screen for additional direct imaging of secondary scintillation on a CCD camera or a CCD chip to provide particle positions. The available times from the delay-line can then used to calculate arrival times for the particles.

It will be appreciated that the present invention is not restricted to the exemplary embodiments but can be embodied in various forms of delay-line anodes and the number of conductive members can be increased to further improve the pulse-pair resolution and/or the multi-hit properties. In particular, when more than two particles need to be detected, i.e. n particles, it is envisaged that n+1 conductive members may be provided.

What is claimed is:

1. A device for detecting the position of a particle, the device comprising a delay-line anode (1) which includes at least first, second and third non-parallel conductive members (4a, 4b, 4c) for receiving electromagnetic pulses (30), each one of the conductive members (4a, 4b, 4c) forming a propagation line for electromagnetic signals and having a first and a second terminating end, at least some of which provide a propagated signal to an electronic analyser.

2. A device as claimed in claim 1 further comprising a secondary electron multiplier (40), in a form of at least one of a micro-channel plate, a stack (40) thereof, a microsphere plate, a stack thereof, and a gas proportional chamber.

3. A device as claimed in claim 1 further comprising six amplifiers, in a form of differential amplifiers, each one assigned to one of said terminating ends of said conductive members (4a, 4b, 4c).

4. A device as claimed in claim 3 further comprising six discriminators, preferably constant-fraction discriminators, each one assigned to one of said amplifiers.

5. A device as claimed in claim 1 further comprising six or more time-to-digital-converter (TDC) channels, in a form of multi-hit TDC channels, each one assigned to at least one of said terminating ends, said amplifiers and said discriminators.

6. A device as claimed in claim 5 further comprising a microprocessor computer for processing the timing information of the TDC channels and for visualising at one of the position and time of creation of an electromagnetic pulse.

7. A device as claimed in claim 1, wherein said first, second and third conductive members (4a, 4b, 4c) have an angle of 60° or approximately 60° between each other.

8. A device as claimed in claim 1, wherein at least one of said first, second or third conductive members comprise a first, second and third pair of conductors (4a, 4a', 4b, 4b', 4c, 4c'), respectively, in a form of wire pairs forming a Lecher line, wound around a holder plate (2).

9. A device as claimed in claim 1, wherein at least one of said first, second and third conductive members (4a, 4b, 4c) are provided on a dielectric substrate, in a form of a meander line.

10. A device as claimed in claim 1, wherein at least one of said first, second and third conductive members are provided on a dielectric substrate, forming a plurality of planar extended structures (104) being electrically connected in one direction.

11. A device as claimed in claim 1, wherein a mean pulse-pair resolution is approximately 5 ns or less.

12. A device as claimed in claim 11, wherein the mean pulse-pair resolution is approximately 2 ns or less.

13. An atom probe instrument for microstructural and microchemical analysis of materials, the instrument comprising a device as claimed in claim 1.

14. A method for detecting the spatial position of an electromagnetic pulse, which method comprises the following steps:

(a) providing at least a first, second and a third conductive member (4a, 4b, 4c) having each a first and second terminating ends;

(b) receiving an electromagnetic pulse on a portion (30) of said first, second and third conductive members (4a, 4b, 4c);

(c) propagating said electromagnetic pulse on said conductive members (4a, 4b, 4c); and (d) determining the local position of said portion (30) of said first, second and third conductive members by measuring the the signal propagation time of said electromagnetic pulse on said first, second and third conductive members; and reconstructing the position of said portion (30) of said first, second and third conductive members from said signal propagation times.

15. A method as claimed in claim 14, wherein said electromagnetic pulse is created by a moving cloud of charged particles (30), in a form of a cloud of electrons.

16. A method as claimed in claim 14, wherein a portion of said first, second and third conductive members (4a, 4b, 4c) comprise a pair of conductors (4a, 4a', 4b, 4b', 4c, 4c'), in a form of metallic wires forming a Lecher line.

17. A method as claimed in claim 14, further comprising amplifying said electromagnetic pulse by a secondary electron multiplier (40) in a form of at least one of a micro-channel plate, a stack thereof (40), a micro-sphere plate, a stack thereof, and a gas proportional chamber.

18. A method as claimed in claim 14, further comprising amplifying said electromagnetic pulse using six amplifiers, preferably differential amplifiers, each amplifier being assigned to one of said terminating ends of said conductive members (4a, 4b, 4c).

19. A method as claimed in claim 18 further comprising the step of discriminating the electromagnetic pulse by six constant-fraction discriminators, each discriminator being assigned to one of said amplifiers.

20. A method as claimed in claim 14, comprising employing six or more TDC channels in a form of multi-hit TDC channels for measuring the arrival times of said electromagnetic pulse at said terminating ends.

21. A method as claimed in claim 14, wherein the spatial position of said portion (30) is determined by a time difference of the arrival of said electromagnetic pulse at said first and second terminating ends.

22. A method as claimed in claim 14, wherein the time of inducing said electromagnetic pulse on said conductive members (4a, 4b, 4c) is determined, by taking a signal from a micro-channel plate (40), front or rear side (40a, 40b), or from an anode holder (2) or from a fluorescent screen (50).

23. A device for detecting the position of a particle, the device comprising a delay-line anode (1) which includes at least first, second and third non-parallel conductive members (4a, 4b, 4c) for receiving electromagnetic pulses (30), each one of the conductive members (4a, 4b, 4c) forming a propagation line for electromagnetic signals and having a first and a second terminating end, at least some of which provide a progagated signal to an electronic analyser, comprising a fluorescent screen in a form of a phosphor screen (50), disposed adjacent to the first, second and third non-parallel conductive members (4a, 4b, 4c).

24. A device as claimed in claim 23, further comprising a CCD camera or CCD chip for imaging secondary scintillation from the fluorescent screen.

25. A device as claimed in claim 23, wherein an electrically isolated grid is disposed between an electrically isolated fluorescent screen, in a form of a phosphor screen, and the three conductive members (4a, 4b, 4c).

26. A device for detecting the position of a particle, the device comprising a delay-line anode (1) which includes at least first, second and third non-parallel conductive members (4a, 4b, 4c) for receiving electromagnetic pulses (30), each one of the conductive members (4a, 4b, 4c) forming a propagation line for electromagnetic signals and having a first and a second terminating end, at least some of which provide a propagated signal to an electronic analyser, further comprising a high resistance layer located close to said first, second and third non-parallel conductive members (4a, 4b, 4c) for receiving an electromagnetic pulse.

27. A method as claimed in claim 26, wherein a CCD camera or CCD chip is provided for imaging secondary scintillation from the fluorescent screen (50) to thereby provide further information on the spatial position of the electromagnetic pulse.

28. A method for detecting the spatial position of an electromagnetic pulse, which method comprises the following steps:

(a) providing at least a first, second and a third conductive member (4a, 4b, 4c) having each a first and second terminating ends;

(b) receiving an electromagnetic pulse on a portion (30) of said first, second and third conductive members (4a, 4b, 4c);

(c) propagating said electromagnetic pulse on said conductive members (4a, 4b, 4c); and (d) determining the local position of said portion (30) of said first, second and third conductive members by measuring the time of the arrival of said electromagnetic pulse at least one of said first and second terminating ends, wherein a fluorescent screen, in a form of a phosphor screen (50), is provided adjacent the first, second and third conductive members (4a, 4b, 4c).

29. A method for detecting the spatial position of an electromagnetic pulse, which method comprises the following steps:

(a) providing at least a first, second and a third conductive member (4a, 4b, 4c) having each a first and second terminating ends;

(b) receiving an electromagnetic pulse on said first, second and third conductive members (4a, 4b, 4c);

(c) propagating said electromagnetic pulse on said conductive members (4a, 4b, 4c); and (d) determining the spatial position of said electromagnetic pulse by measuring the time of the arrival of said electromagnetic pulse at said first and second terminating ends of said first, second and third conductive members; and p1 (e) determining said spatial position by the time differences of the arrival of said electromagnetic pulse at said first and second terminating ends.

* * * * *